(12) United States Patent
Dishongh et al.

(10) Patent No.: US 7,836,003 B2
(45) Date of Patent: Nov. 16, 2010

(54) ASSISTING A USER EXPERIENCING COGNITIVE DECLINE BY RETRACING FOOTSTEPS

(75) Inventors: Terry Dishongh, Portland, OR (US); Simon Roberts, Kilcock (IE); Julie Behan, Shanagolden (IE)

(73) Assignee: Intel Corporation, Santa Clara, CA (US)

( * ) Notice: Subject to any disclaimer, the term of this patent is extended or adjusted under 35 U.S.C. 154(b) by 564 days.

(21) Appl. No.: 11/859,455

(22) Filed: Sep. 21, 2007

(65) Prior Publication Data

US 2009/0083205 A1 Mar. 26, 2009

(51) Int. Cl.
*G06N 5/00* (2006.01)
(52) U.S. Cl. .......................... 706/46; 706/45
(58) Field of Classification Search ................. 715/707; 706/45, 46
See application file for complete search history.

(56) References Cited

U.S. PATENT DOCUMENTS 6,262,730 B1 * 7/2001 Horvitz et al. .............. 715/707

* cited by examiner

*Primary Examiner*—Wilbert L Starks, Jr.
(74) *Attorney, Agent, or Firm*—Cool Patent, P.C.; Joseph P. Curtin

(57) ABSTRACT

Briefly, in accordance with one or more embodiments, a user experiencing cognitive decline or a similar affliction may be assisted with the performance of daily tasks or routines. An information handling system installed in a central room of the user's living quarters, such as a kitchen, to observe the user and determine if the user is having difficulty completing the task or routine. If it is determined that the user is experiencing difficulty, the information handling system may provide one or more cues to the user to assist the user in remembering what the user has just completed in order to indicate to the user what part of the task remains to be completed. For example, the steps recently taken by the user may be retraced by projecting an image of those footsteps onto the floor to show the user where she has recently been.

21 Claims, 4 Drawing Sheets

ASSISTING A USER EXPERIENCING COGNITIVE DECLINE BY RETRACING FOOTSTEPS

BACKGROUND

As the population ages, so does the percentage of people with various cognitive impairments. Ethnography research has shown that individuals suffering from mild cognitive impairments often get confused while performing the steps of a common task. This confusion is visibly present and is often represented by the user stopping suddenly, looking around or by tapping their heads.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 3A:
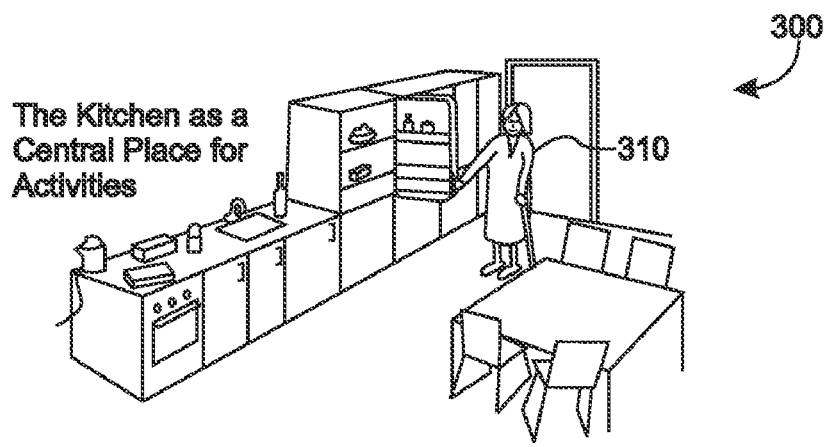
Figure 3B:
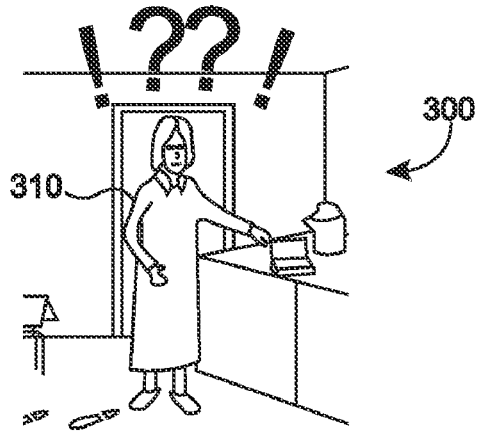
Figure 3C:
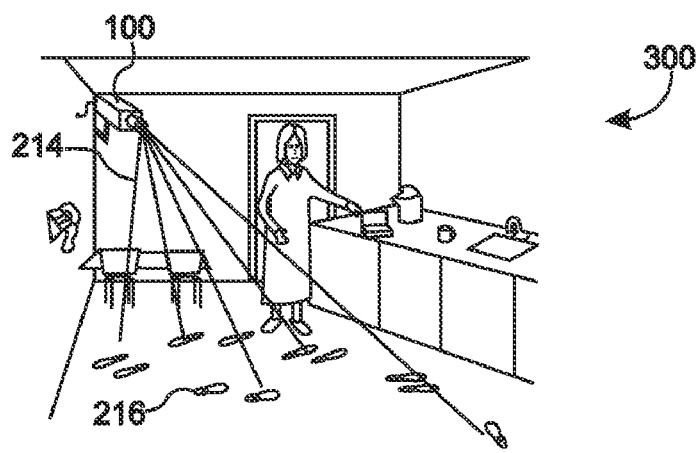
Figure 4:
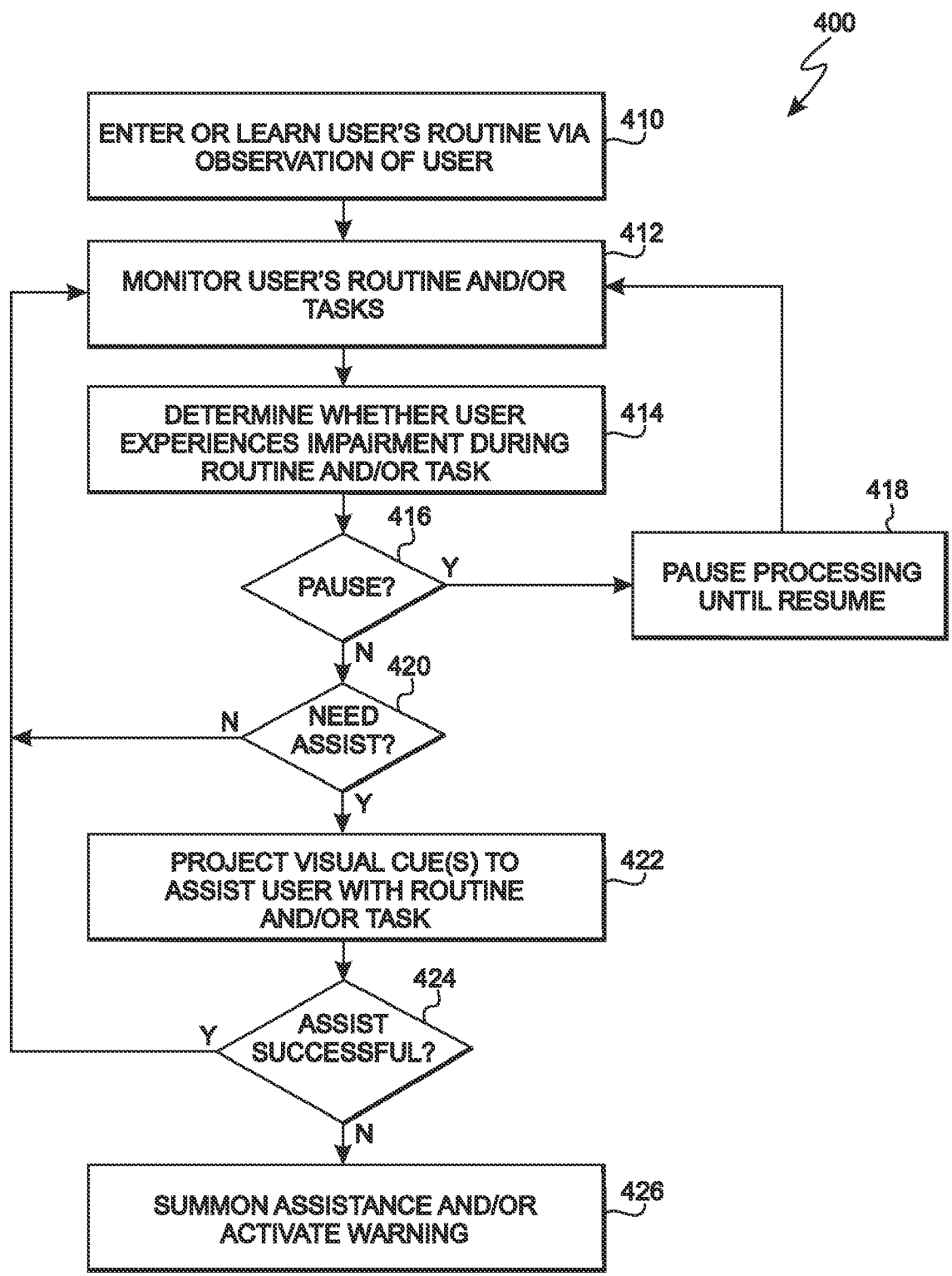

FIG. 3A, FIG. 3B, and FIG. 3C are illustrations of an information handling system providing assistance to a user experiencing cognitive decline in accordance with one or more embodiments; and FIG. 4 is a flow diagram of a method of assisting a user experiencing cognitive decline in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Figure 1:
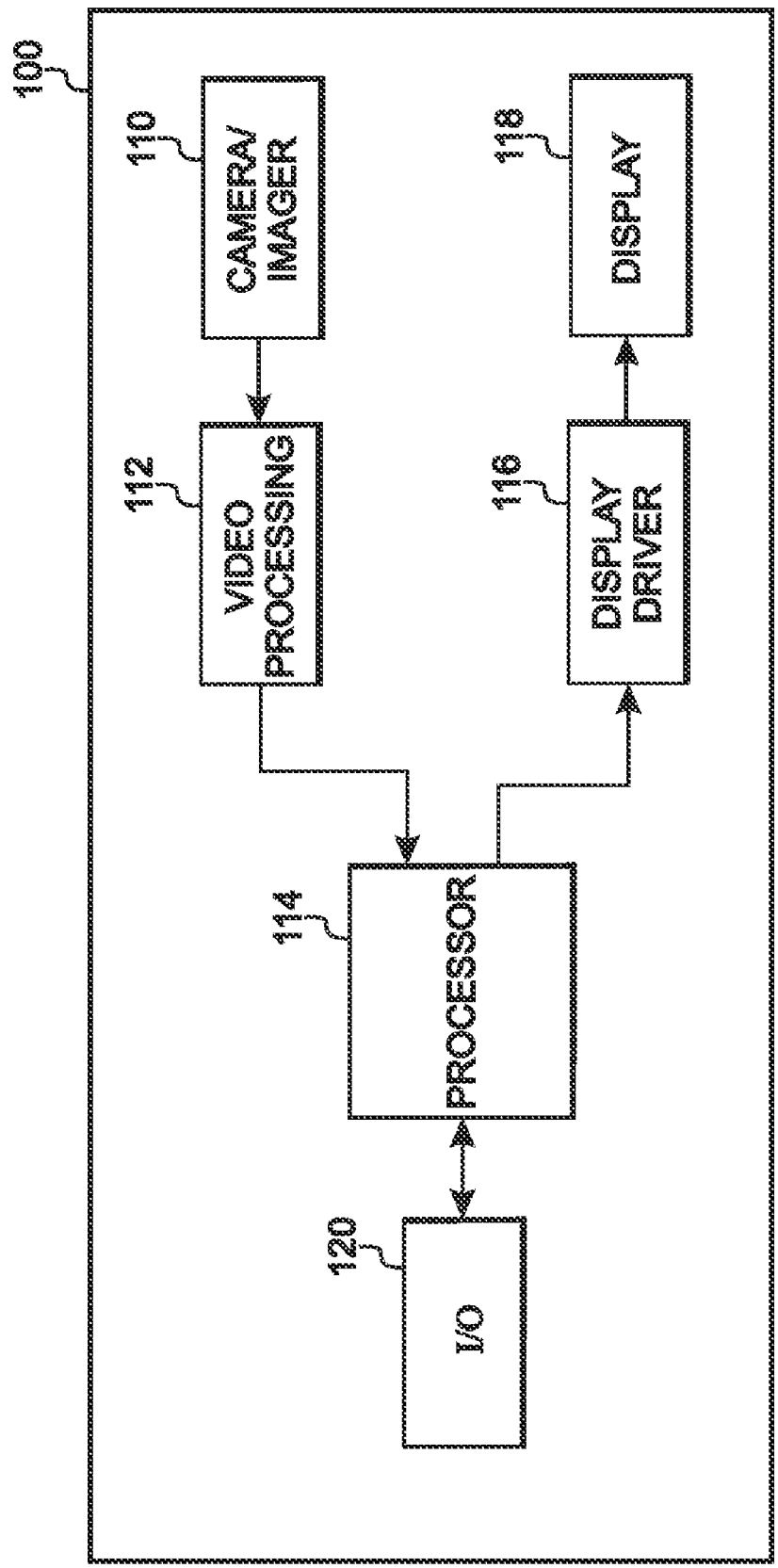
FIG. 1 is a block diagram of an information handling system capable of assisting a user experiencing cognitive decline by retracing footsteps in accordance with one or more embodiments.

Referring now to FIG. 1, a block diagram of an information handling system capable of assisting a user experiencing cognitive decline by retracing footsteps in accordance with one or more embodiments will be discussed. As shown in FIG. 1, information handling system 100 is capable of assisting a user who may be experiencing cognitive decline or a similar condition to assist the user in performing a routine or task to completion if the user experiences some cognitive decline or similar event during the performance of the task or routine that may prevent user from completing the task or routine. In one or more embodiments, information handling system 100 may comprise a camera 110 or other imaging device to capture an image of the user, or to otherwise monitor the user, during the execution of a routine or task. Camera 110 may couple to a video processing subsystem 112 to receive and process images captured by camera 110 and provide the processed images to a processor 114. Processor 114 may comprise one or more processors having one or more cores to process the video information received from video processing subsystem 112. In one or more embodiments, processor 112 may comprise an embedded controller, and in one or more alternative embodiments processor may comprise a general purpose processor 114, although the scope of the claimed subject matter is not limited in this respect. Processor 114 may provide information to display driver 116 and display 118 to cause display 118 to project an image or other indicia. In one or more embodiments, display 118 may comprise any various types of display system, for example a digital light processor (DLP), a scanned beam laser display projector, a liquid crystal display (LCD) projector, a liquid crystal on silicon (LCOS) display projector, a digital micromirror device projector, or the like capable of projecting an image or other indicia on a remote surface or object. In one or more embodiments, display 118 may be capable of projecting white light, monochromatic laser light, or a combination of white light or laser light having, and/or any light having one or more chromatic components, to project a white light image, a monochromatic image, and/or a multi-chromatic image; or combinations thereof, and the scope of the claimed subject matter is not limited in this respect. In one or more embodiments, display 118 may comprise a microelectromechanical system (MEMS) based scanned beam display such as Picop™ display engine available from Microvision, Inc. of Redmond, Wash., USA, although the scope of the claimed subject matter is not limited in this respect.

In one or more embodiments, processor 114 of information handling system 100 is programmed with one or more routines or tasks of a user, for example a process by which the user gets dressed, prepares a meal, prepares a drink such as tea or coffee, and so on. Alternatively, processor 114 may adaptively learn one or more routines or tasks of the user via observation of the user and applying a learning algorithm or neural network type algorithm to program processor 114 with such learned routines or tasks. Processor 114 may include non-volatile memory or alternatively may be coupled to non-volatile memory such as flash memory or a hard disk drive (not shown) that is disposed within information handling system 100 and coupled to processor 114. Furthermore, information handling system 100 may couple to one or more remote device via input/output (110) subsystem 120 to such devices, or alternatively to a remote device coupled to information handling system 100 via a network such as a wireless local area network (WLAN), wireless wide area network (WWAN), and/or the Internet, and so on, although the scope of the claimed subject matter is not limited in this respect. In one or more embodiments, processor 114 may receive such routines and/or tasks, and/or the processing of such routines or tasks, may be performed by a remote device such as a personal computer (PC) or server coupled to processor 114 via 110 subsystem 120, although the scope of the claimed subject matter is not limited in this respect. Information handling system 100 may provide one or more cues to the user, such as a visual retracing of the user's footsteps, in the event the user experiences a cognitive decline event or the like as shown and described in further detail, below.

Figure 2:
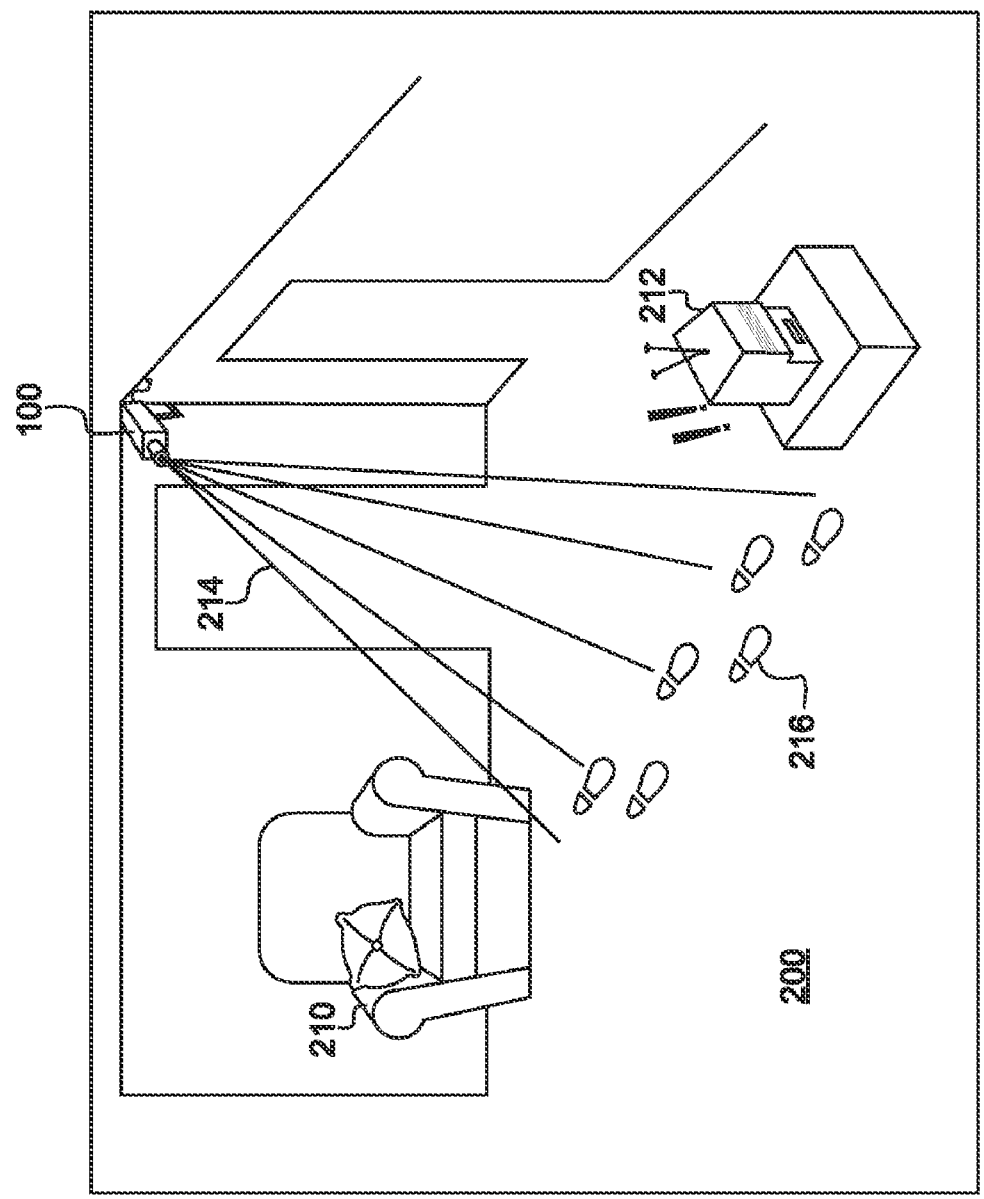
FIG. 2 is a diagram of an information handling system projecting a visual cue to a user experiencing cognitive decline in accordance with one or more embodiments.

Referring now to FIG. 2, a diagram of an information handling system projecting a visual cue to a user experiencing cognitive decline in accordance with one or more embodiments will be discussed. As shown in FIG. 2, information handling system 100 may be installed in a room. 900 of the user's home or similar environment. Information handling system 100 is capable of observing the routines and/or tasks of the user which may be recorded at least temporarily by information handling system 100, or alternatively such routines or tasks of the user may be preprogrammed into information handling system 100 as discussed, above. In the event information handling system 100 observes the user experiencing a cognitive-decline event, information handling system 100 may determined that the user needs assistance to complete the routine or task. For example, as shown in FIG. 2, the user may need to be reminded to turn off the television 212 before going to bed. Information handling system 100 is capable of observing the user and determining that the user has forgotten to turn off television 212. To remind the user to turn off the television 212, information handling system 100 may project a visual cue to the user to remind the user to walk from chair 210 to television, for example to project one or more footsteps 216 leading from chair 210 to television 212 projected light beams 214 projected by display 118. Alternatively, if the user forgot the last action that the user has previously performed, such as if the last action taken by the user was to walk from chair 210 to television 212, information handling system 100 is capable of projecting footsteps 216 on the ground leading from chair 210 to television 212 to retrace the last footsteps traversed by user 212. In one or more embodiments, one or more information handling systems 100 may be placed in one or more rooms in a home in which the user may spend time or perform tasks for which the user may require assistance, so that the user may be observed while performing such tasks and being cued to help complete the tasks as needed. Such observing and cueing of the user may be further capable of assisting the user in completing one or more tasks as shown in and described with respect to FIGS. 3A-3C, below.

Referring now to FIG. 3A, FIG. 3B, and FIG. 3C, illustrations of an information handling system providing assistance to a user experiencing cognitive decline in accordance with one or more embodiments will be discussed. As shown in FIG. 3A, a user 310 may occupy a room such as kitchen 300 in which the user may perform a task such as making a pot of tea or preparing a meal. The kitchen 300 may be a central hub for the activities of user 310, wherein user 310 may spend her a greater part of her day completing various activities. The user 310 may start off performing the task in FIG. 3A.

As shown in FIG. 3B, the user 310 may experience trouble remembering the task she was working on, and forget or lose track of what she has completed and/or what she has remaining to complete. The user 310 may exhibit behavior that is detectable by information handling system 100 and from which information handling system 100 may detect that the user is experiencing a cognitive-decline event and may need assistance. Ethnography research has shown that individuals suffering from mild cognitive impairments often get confused within the steps of a common task. This confusion is visibly present and is often represented by the user stopping suddenly, looking around or by tapping her head. In the event information handling system 100 detects that the user 310 is experiencing such a cognitive-decline event, information handling system 100 is capable of providing one or more cues to remind the user 310 of her current position in the sequence of her task, for example to indicate to the user 310 of what she has previously completed.

For example, as shown in FIG. 3C, information handling system 100 may project footsteps 216 on the floor of kitchen 300 via the output beams 214 of projector 118. The projected footsteps 216 may retrace the steps that the user 310 has previously completed so that the user 310 may then be reminded of what portion of the task has been completed and what portion of the task is remaining to be completed. Furthermore, in one or more embodiments, one or more of the output beams 214 may be projected onto one or more objects in the kitchen 300 to provide further cues to the user 310 about certain tasks that have been completed or that need to be completed next. For example, if the user needs to place the teapot on the stove, one or more of the output beams 214 may illuminate the teapot and/or the stove to indicate that the teapot needs to be placed on the stove. In one or more embodiments, the images and/or indicia projected by information handling system 100 may be modulated and/or illuminated in a pattern or manner to further indicate to the user what has been completed already. For example, the earlier taken footsteps may appear more faint or faded than recently taken footsteps. Alternatively, the footsteps 216 may be illuminated in series and then faded after a certain amount of time, with earlier projected footsteps fading away before later projected footsteps, to indicate the order in which the user 310 took the steps. Although FIGS. 3A, 3B, and 3C shows one particular example in which information handling system 100 may observe and assist a user 310 experiencing cognitive decline to complete a task or routine, and the scope of the claimed subject matter is not limited in this respect.

Referring now FIG. 4, a flow diagram of a method of assisting a user experiencing cognitive decline in accordance with one or more embodiments will be discussed. Method 400 shown in FIG. 4 illustrates one particular method of assisting a user experiencing cognitive decline, however other orders of the blocks shown in FIG. 4 may also be utilized, with more or fewer blocks, and the scope of the claimed subject matter is not limited in this respect. In one or more embodiments, one or more routines or tasks of a user 310 may be entered into information handling system 100 at block 410, or information handling system 100 may learn the user's routine or tasks via observation of the user 310. Information handling system 100 may then monitor the user 310 at block 412 as the user 310 performs one or more routines and/or tasks, for example during daily activity of the user 310. Information handling system 100 may then determine at block 414 whether the user 310 experience any sort of impairment during the performance of the routine and/or task via observation of the user 310 and determining from the user's behavior whether the user 310 is impaired confused, flustered, and/or otherwise having trouble with the task or routine. For example, the user 310 may have stopped performing the task for a predetermined period of time, the user 310 may be tapping her head, or otherwise doing something that would visually indicate to information handling system 100 that the user 310 is having trouble completing or remembering the task.

In one or more embodiments, method 400 may be paused at least temporarily from monitoring the user to determine whether the user 310 is having trouble completing a task or routine. In some embodiments, method 400 may be voluntarily paused by the user 310 for example by hitting a pause button on information handling system 100 or a pause button on a remote device capable of communicating with information handling system 100 and indicating to pause method 400. Alternatively, information handling system 100 may determine that method 400 should be paused at least temporarily, for example if information handling system 100 observes that another person has entered the room such as kitchen 300 and is engaging in conversation with the user 310, indicating that a temporary stopping of the routine or task by the user 310 is intentional, and the user does not require any assistance with completing the task or routine. Thus, if it is determined at block 416 to pause method 400, method 400 may be paused at block 418 until method 400 is subsequently resumed. For example, method 400 may be automatically resumed a predetermined duration after a pause event if the user 310 subsequently actuates the pause button again to resume method 400, or if information handling system 100 detects that the event causing the pause is no longer in effect, for example if the person having a conversation with the user 310 has left the room.

In one or more embodiments, in the event it is determined at block 420 that the user 310 needs assistance in completing a task or routine, information handling system 100 may project one or more visual cues at block 422 to assist the user 310 with the task or routine. For example, information handling system 100 may retrace the steps of the user 310 by projecting footsteps 216 that the user 310 has recently taken, for example as shown in FIG. 2 or FIG. 3C. If it is determined that the user 310 does not need assistance with a particular task or routine, method 400 may continue at block 412 by continuing to monitor the user's routine or tasks.

The user's responsiveness to the visual cues provided by information handling system at block 422 may be monitored, and a determination may be made at block 424 whether the assistance provided by information handling system 100 was successful. In the event it is determined that the assistance provided was successful, for example if information handling system 100 observes that the user 310 is continuing to complete the task or routine in response to the visual cues, the assistance provided may end, and method 400 may continue at block 412 to monitor the user 310. However, if it is determined at block 424 that the user 310 is not responding to the cues provided by information handling system 100, for example if the user 310 still appears confused or is otherwise still not completing or having trouble completing the task or routine, assistance may be summoned and/or a warning may be activated at block 426. For example, assistance may be summoned, or a warning may be transmitted, by information handling system 100 through a network or a telephone system to a local person or authority, for example an occupational therapist or a medical professional, to come to the user's house to determine whether the user 310 is experiencing any additional issues or impairment other than cognitive decline. It should be noted that method 400 is merely one example for assisting a user experiencing cognitive decline, and other alternative embodiments and/or applications of method 400 and/or information handling system may be implemented, and the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to assisting a user experiencing cognitive decline by retracing footsteps and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
observing by an imaging device a user performing a task;
determining whether the user needs assistance in performing the task based on the observation by the imaging device; and
in the event it is determined that the user needs assistance in performing the task, projecting a visual cue on a surface or an object to assist the user in performing the task, the surface or the object being remote from a point of projection of the visual cue.

2. A method as claimed in claim 1, said projecting comprising projecting an image of footsteps recently taken by the user to indicate to the user a portion of the task that was recently performed.

3. A method as claimed in claim 1, said projecting comprising projecting an image of footsteps that need to be taken by the user to continue performing the task.

4. A method as claimed in claim 1, said determining comprising determining whether the user is experiencing a cognitive decline event.

5. A method as claimed in claim 1, said determining comprising determining whether the user is experiencing a cognitive decline event, the cognitive decline event being indicated by the user stopping suddenly, looking around, or tapping her head, or combinations thereof.

6. A method as claimed in claim 1, further comprising pausing said determining at least temporarily in response to a pause event, and then resuming said determining after termination of the pause event.

7. A method as claimed in claim 1, said observing comprising capturing an image of the user.

8. A method as claimed in claim 1, said observing comprising capturing an image of the user and comparing the observed behavior of the user to a programmed task, or to a learned task, or combinations thereof.

9. A method as claimed in claim 1, wherein determining comprises determining whether the user is experiencing a cognitive decline event, the cognitive decline event being indicated by the user looking around, or tapping her head, or combinations thereof.

10. An apparatus, comprising:
an imager capable of capturing an image of a user performing a task;

a processor coupled with said imager, said processor being capable of determining whether the user needs assistance in performing the task; and a display capable of projecting a visual cue on a surface or an object that is remote from the display to assist the user in performing the task in the event said processor determines that the user needs assistance in performing the task.

11. An apparatus as claimed in claim 10, said display comprising a digital light projector, a scanned beam laser display projector, a liquid crystal display projector, a liquid crystal on silicon display projector, a digital micromirror device projector, a microelectromechanical system display projector, or combinations thereof, that projects the visual cue on the surface or the object.

12. An apparatus as claimed in claim 10, said display being capable of projecting an image of footsteps recently taken by the user to indicate to the user a portion of the task that was recently performed.

13. An apparatus as claimed in claim 10, said display being capable of projecting an image of footsteps that need to be taken by the user to continue performing the task.

14. An apparatus as claimed in claim 10, said processor being capable of determining whether the user is experiencing a cognitive decline event based at least in part on an image captured by said imager of the user performing the task.

15. An apparatus as claimed in claim 10, said processor being capable of determining whether the user is experiencing a cognitive decline event based at least in part on the user stopping suddenly, looking around, or tapping her head, or combinations thereof.

16. An apparatus as claimed in claim 10, said processor being capable of determining whether the user is experiencing a cognitive decline event based at least in part on said processor comparing the observed behavior of the user to a programmed task, or to a learned task, or combinations thereof.

17. An apparatus as claimed in claim 10, the processor being capable of determining whether the user is experiencing a cognitive decline event based at least in part on the user looking around, or tapping her head, or combinations thereof.

18. A method, comprising:
observing by an imaging device a user performing a task;
determining whether the user needs assistance in performing the task based on the observation by the imaging device; and
in the event it is determined that the user needs assistance in performing the task, projecting an image of footsteps recently taken by the user to indicate to the user a portion of the task that was recently performed.

19. A method as claimed in claim 18, wherein projecting comprises projecting an image of footsteps that need to be taken by the user to continue performing the task.

20. An apparatus, comprising:
an imager capable of capturing an image of a user performing a task;
a processor coupled with the imager, the processor being capable of determining whether the user needs assistance in performing the task; and
a display capable of projecting a visual cue to assist the user in performing the task in the event the processor determines that the user needs assistance in performing the task, the display comprising a digital light projector, a scanned beam laser display projector, a liquid crystal display projector, a liquid crystal on silicon display projector, a digital micromirror device projector, a microelectromechanical system display projector, or combinations thereof, and the display being capable of projecting an image of footsteps recently taken by the user to indicate to the user a portion of the task that was recently performed.

21. An apparatus as claimed in claim 20, wherein the display is capable of projecting an image of footsteps that need to be taken by the user to continue performing the task.

* * * * *